US008342068B2

(12) United States Patent
Adami

(10) Patent No.: US 8,342,068 B2
(45) Date of Patent: Jan. 1, 2013

(54) DEVICE FOR LONGITUDINAL CUTTING OF A CONTINUOUS WEB MATERIAL, SUCH AS CORRUGATED CARDBOARD

(75) Inventor: Mauro Adami, Lucca (IT)

(73) Assignee: Foser S.p.A., Lucca (IT)

( * ) Notice: Subject to any disclaimer, the term of this patent is extended or adjusted under 35 U.S.C. 154(b) by 0 days.

(21) Appl. No.: 12/396,161

(22) Filed: Mar. 2, 2009

(65) Prior Publication Data

US 2009/0178528 A1 Jul. 16, 2009

Related U.S. Application Data

(62) Division of application No. 11/011,774, filed on Dec. 14, 2004, now abandoned.

(30) Foreign Application Priority Data

Oct. 12, 2004 (EP) .................................... 04425768

(51) Int. Cl.
*B23D 19/00* (2006.01)

(52) U.S. Cl. ................ 83/469; 83/498; 83/508; 83/658; 493/366

(58) Field of Classification Search .................... 83/168, 83/169, 174, 174.1, 105, 508, 349, 941, 539, 83/658, 425.2–425.4, 407, 864, 876, 883–885, 83/498, 499, 504, 507, 508.2, 508.3; 493/363–368
See application file for complete search history.

(56) References Cited

U.S. PATENT DOCUMENTS

| | | | | |
|---|---|---|---|---|
| 3,763,748 | A * | 10/1973 | Gallagher, Jr. | 493/365 |
| 4,583,459 | A * | 4/1986 | Abendroth et al. | 101/217 |
| 5,090,281 | A | 2/1992 | Paulson et al. | |
| 5,138,921 | A * | 8/1992 | Winckler | 83/501 |
| 5,341,713 | A * | 8/1994 | Okamoto et al. | 83/865 |
| 5,360,760 | A | 11/1994 | Hayashi | |
| 5,393,294 | A | 2/1995 | Jobst | |
| 5,406,869 | A * | 4/1995 | Prochnow et al. | 83/22 |
| 5,435,217 | A | 7/1995 | Kato et al. | |
| 5,483,856 | A | 1/1996 | Smitterberg et al. | |
| 5,496,431 | A | 3/1996 | Hirakawa et al. | |
| 5,551,328 | A | 9/1996 | Hsu | |
| 5,657,677 | A | 8/1997 | Cuir et al. | |
| 5,660,095 | A | 8/1997 | Smitterberg et al. | |
| 5,761,980 | A * | 6/1998 | Ima et al. | 83/500 |

(Continued)

FOREIGN PATENT DOCUMENTS

EP 0458340 11/1991

(Continued)

*Primary Examiner* — Phong Nguyen

(74) *Attorney, Agent, or Firm* — Michael Best & Friedrich LLP

(57) ABSTRACT

The device comprises a path for the web material (N) and, along said path, at least one cutting unit (7A). The cutting unit comprises: a plurality of intermediate disk-shaped blades (9A) disposed on one side of the feed path of the material, which can be positioned transversely to the direction of feed and cooperating with a fixed counter-blade (33A) disposed on the opposite side of said path. Also provided are two lateral disk-shaped blades (10A) to cut the trimmings; and a member for transverse positioning of the blades. The two lateral blades each cooperate with a respective movable counter-blade (71A), separate from the fixed counter-blade, which can be positioned transversely to the direction of feed of the web material.

20 Claims, 7 Drawing Sheets

U.S. PATENT DOCUMENTS

| | | | |
|---|---|---|---|
| 5,857,395 A | | 1/1999 | Bohm et al. |
| 5,918,519 A | * | 7/1999 | Schnabel et al. ................ 83/428 |
| 5,951,454 A | | 9/1999 | Adami |
| 6,026,727 A | | 2/2000 | Meeks |
| 6,038,976 A | | 3/2000 | Helmstadter et al. |
| 6,071,222 A | | 6/2000 | Schneider |
| 6,092,452 A | | 7/2000 | Adami |
| 6,103,171 A | | 8/2000 | Cummings |
| 6,117,381 A | | 9/2000 | Cummings |
| 6,165,117 A | | 12/2000 | Adami |
| 6,553,883 B1 | | 4/2003 | Adami |
| 6,612,214 B2 | | 9/2003 | Neal |
| 6,684,749 B2 | * | 2/2004 | Adami ............................ 83/408 |
| 6,689,037 B2 | * | 2/2004 | Waldeck et al. .............. 493/355 |
| 6,722,243 B2 | | 4/2004 | Adami |
| 7,370,562 B2 | | 5/2008 | Adachi et al. |
| 2001/0047704 A1 | * | 12/2001 | Adami .............................. 83/34 |
| 2004/0171238 A1 | | 9/2004 | Arena et al. |
| 2005/0241671 A1 | | 11/2005 | Dong et al. |
| 2005/0263795 A1 | | 12/2005 | Choi et al. |

FOREIGN PATENT DOCUMENTS

| | | | |
|---|---|---|---|
| EP | 0468374 | | 1/1992 |
| EP | 0534177 | | 3/1993 |
| EP | 0607084 | | 7/1994 |
| EP | 0737553 | | 10/1996 |
| EP | 0884143 | * | 12/1998 |
| EP | 0990491 | * | 4/2000 |
| EP | 0990491 A1 | * | 4/2000 |

* cited by examiner

DEVICE FOR LONGITUDINAL CUTTING OF A CONTINUOUS WEB MATERIAL, SUCH AS CORRUGATED CARDBOARD

CROSS-REFERENCE TO RELATED APPLICATIONS

This application is a divisional of and claims priority to U.S. patent application Ser. No. 11/011,774, filed Dec. 14, 2004, which claims the benefit of European Patent Application No. 04425768.1, filed on Oct. 12, 2004, the entire contents of both of which are hereby incorporated by reference.

TECHNICAL FIELD

The present invention relates to a device for longitudinal cutting of a continuous web material, such as, although not exclusively, a corrugated cardboard. The invention also relates to a slitter-scorer machine, which comprises a cutting device to perform slitting and scoring of a corrugated cardboard or another continuous web material.

STATE OF THE ART

In the production of corrugated cardboard articles, such as cardboard boxes, a web of corrugated cardboard fed continuously is divided longitudinally by means of cutting blades into a plurality of strips of various widths and each strip is scored according to scoring lines disposed variably along the transverse extension of the strips of cardboard. Besides cutting the cardboard web into individual strips, the cutting blades trim the web, that is, they eliminate two thin strips of web material along the longitudinal edges, called trimmings. The strips of cardboard are then cut transversely to produce individual sheets of scored cardboard for the production of boxes or other products.

The position of the scoring and slitting lines changes from one order to another. Typically, orders in this sector are very small, so that the positions of the cutting blades, the counter-blades and the scoring tools must be changed frequently. With the object of performing rapid order changes, double slitting and scoring devices have been produced, that is, devices or machines wherein whilst one order is being processed with one scoring tool unit and one blade and counter-blade unit disposed in a first position, the scoring tools and blades and counter-blades of a second unit are positioned to process the subsequent order. When the order is changed, the tools of the first scoring and slitting tool unit are disengaged from the cardboard and the tools of the second unit engage in the cardboard to start processing the subsequent order. An order change area is produced in the cardboard, which is discarded.

In some cases the strips of cardboard produced by cutting the web of corrugated cardboard are fed along paths on two different levels, separating a first group of strips which proceed along a path at a lower height from a second group of strips which proceed along a path towards a higher height. The two paths are separated at the level of an intermediate cutting line, the transverse position of which generally changes when the order is changed.

U.S. Pat. No. 5,406,869 and U.S. Pat. No. 5,090,281 describe devices for cutting corrugated cardboard, wherein disk-shaped cutting blades disposed above the cardboard cooperate with counter-blades disposed below the corrugated cardboard, to make the longitudinal cut. When the order is changed both the blades and the counter-blades must be repositioned, which requires the presence of a positioning robot above the path of the cardboard and a further robot under said path.

U.S. Pat. No. 5,761,980 describes a cutting device for corrugated cardboard wherein the cutting blades cooperate with counter-blades with a particular configuration, having the object of simplifying reciprocal positioning of the blades and counter-blades.

U.S. Pat. No. 3,763,748 describes a cutting device for corrugated cardboard, wherein disk-shaped cutting blades cooperate with a rectilinear plastic element. The plastic is incised by the cutting blade in the position in which the cardboard is to be cut longitudinally, to form a channel constituting the counter-blade. This construction makes it unnecessary to produce counter-blades which must be positioned at each order change, but does not solve the problem of frequent order changes, as repositioning of the cutting blades in positions which differ from order to order causes rapid wear of the plastic in which the channels forming the counter-blades are cut. This is particularly true in the lateral areas in which the trimmings are cut, as the cutting lines of the trimmings in the different work orders are very close to one another, which leads to rapid wear of the plastic.

EP-A-458340, EP-A-468374, EP-A-534177, EP-A-607084, US-A-5,496,431, EP-A-737553, U.S. Pat. Nos. 6,684,749, 6,092,452 and 5,857,395 describe slitter-scorer systems with particular arrangements to solve the problems arising in the case in which the strips of cardboard are sent to two separate levels at different heights. Particular arrangements are used to join together intermediate cutting lines of two consecutive orders which separate the strips destined for a first level from those destined for a second level, to prevent damaging the cardboard in the order change area.

In some cases, the trim cutting line is not interrupted in the order change area, to obtain continuous trimmings which are easier to eliminate without the risk of jamming. In particular, EP-A-737553 describes a system wherein continuity of the trimming is obtained by means of an auxiliary cutting device, in particular a water jet, which joins two rectilinear cuts of two consecutive orders, formed by disk-shaped blades. U.S. Pat. No. 5,857,395 describes a system wherein the lateral blades which cut the trimmings remain engaged in the cardboard, even during order change, while the blades which make the intermediate cuts are engaged in and disengaged from the cardboard at the level of the order change. U.S. Pat. No. 5,918,519 describes a particular mechanism wherein the disk-shaped blades to cut the trimmings are supported oscillating about a vertical axis, to make the blade pivoting and thereby make a curved cut at the level of the order change. In this case two disk-shaped blade cutting units which operate alternately on subsequent orders cooperate with a single pair of disk-shaped blades which make the continuous cut of the two trimmings and which are disposed in a more forward position and adjacent to the suction mouths for the trimmings.

U.S. Pat. No. 5,393,294 describes a slitter-scorer system wherein particular solutions are provided to perform continuous order change, that is, without cutting the cardboard transversely, also in a system with one level.

U.S. Pat. No. 6,165,117 describes a cutting device wherein, to make it unnecessary to use counter-blades which require to be positioned at each order change, the disk-shaped cutting blades cooperate with a continuous rectilinear edge disposed behind the cardboard to be cut and forming a supporting surface. The blades graze the rectilinear edge without touching it, and may therefore be positioned at any point of the width of the cardboard, without it being necessary to alter the position of the counter-blade. This system has drawbacks as the distance between the cutting edges of the blades and the edge of the counter-blade must be adjusted with extreme precision.

OBJECTS AND SUMMARY OF THE INVENTION

The object of the present invention is to produce a cutting device and in particular a cutting device for slitter-scorer machines destined to process corrugated cardboard or analogous continuous web products, which has a simplified structure with respect to known devices. In particular, the object of a preferred embodiment of the invention is to produce a device which makes it possible to eliminate the need for an autonomous positioning system of the counter-blades, totally or partly overcoming the drawbacks of conventional devices.

According to the invention, a cutting device is provided to perform longitudinal cutting of a continuous web material, with at least one cutting unit comprising: a plurality of intermediate disk-shaped blades disposed on one side of the path of the web material, which can be positioned transversely to the direction of feed of the web material and cooperating with a fixed counter-blade disposed on the opposite side of the path of the web material; a pair of lateral disk-shaped blades to cut the trimmings; and a member for transverse positioning of the blades. The two lateral blades each cooperate with a respective counter-blade, which is movable and can be positioned transversely to the feed direction of the web material.

The counter-blade with which the intermediate blades cooperate is fixed, in the sense that the transverse position thereof does not require adjustment when the position of the cutting blades is changed.

In this way it is possible to radically simplify the positioning mechanisms of the blades and counter-blades, providing a single manipulator or robot only on one side of the path of the web material. This is due to the fact that the intermediate disk-shaped blades cooperate with a fixed counter-blade, while the lateral counter-blades, movable transversely and destined to cut the trimmings of the web materials, can be easily positioned, for example using the same manipulator or robot which performs positioning of the blades, by means of a lateral mechanical connection, external to the edges of the web material.

For this purpose, each of the movable lateral counter-blades may advantageously be connected to the respective lateral blade and movable jointly therewith to be positioned together with the blade transversely to the direction of feed of the web material. An arrangement of this type obtains the further advantage of maintaining the correct reciprocal position between the lateral blade and corresponding counter-blade at all times, without the danger of misalignment caused by incorrect positioning of either of the two.

In a particularly advantageous embodiment of the invention, the fixed counter-blade can comprise a fixed rectilinear element extending transversely to the direction of feed of the web material for a substantial part of the useful width of the device. In a preferred embodiment, the rectilinear element comprises a metal bar made of a hard material, such as hardened steel, and an interchangeable block made of a plastic material, which may consist of a single piece or of several segments positioned end to end with one another in the direction of extension of the rectilinear element.

To obtain an optimal arrangement of the intermediate blades and of the lateral blades with respect to the respective counter-blades, in an advantageous embodiment the axes of rotation of the lateral blades may be staggered with respect to the axes of rotation of the intermediate blades along the direction of feed of the web material. Preferably, the movable counter-blades may be disposed downstream of the fixed counter-blade with respect to the direction of feed of the web material. Consequently, the axes of rotation of the lateral blades will be in a more forward position with respect to the intermediate blades.

In a possible embodiment, each lateral blade and each intermediate blade is carried by a respective slide movable along a transverse guide, to be positioned each time an order is changed. Preferably, each of the movable counter-blades is carried by a shoe sliding transversely to the direction of feed of the web material, on the same guides on which the slides carrying the blades slide, although it would also be possible to use separate guides. Advantageously, the shoe of each movable counter-blade can also be connected to the slide carrying the corresponding lateral blade, for example with a mechanical connection which allows adjustment of the relative distance between shoe and slide.

In a possible embodiment, each intermediate blade and the two lateral blades are carried by respective oscillating arms, the movement of which is controlled by respective actuators, to carry each blade alternately to an operating position or an inoperative position separately from the others. This arrangement is known per se. It allows the order to be changed with specific modes. For example, when the device is incorporated in a two-level processing line, the cutting line which separates the strips of web material conveyed to the two different processing levels can be extended in the order change area, to obtain specific advantages known to those skilled in the art. Details of the operating modes of this type of cutting blade control are described in the U.S. Pat. No. 6,092,452. However, different mechanisms can also be used to support and control the cutting blades, to control movement thereof to the operating position and to the inoperative position.

In general, the device according to the invention can have a single cutting unit, with a single series of intermediate blades and a single pair of lateral blades to cut the trimmings. In this case, when an order is changed, the blades operating are disengaged from the web material, translated from the current position to the position for subsequent processing and returned to the operating position engaged in the web material. Nonetheless, the device preferably has two cutting units disposed along the feed path of the web material, each comprising a series of intermediate blades cooperating with a fixed counter-blade and a pair of lateral blades (one per side) with the respective movable counter-blades.

The cutting device preferably includes one or more scoring units disposed along the feed path of the web material, to form a slitter-scorer machine.

According to a different aspect, the invention relates to a device for longitudinal cutting of a continuous web material, comprising a path for the web material and, along said path, at least one cutting unit comprising: a plurality of disk-shaped blades disposed on one side of said path, which can be positioned transversely to the direction of feed of the web material and cooperating with a fixed counter-blade disposed on the opposite side of said path, comprising a rectilinear element extending transversely to the direction of feed of the web material and for a substantial part of the useful width of the device. The rectilinear element comprises a metal bar and an interchangeable plastic block associated therewith. The metal bar and the interchangeable block advantageously form a flat supporting surface on which the web material runs.

BRIEF DESCRIPTION OF THE DRAWINGS

The invention shall now be better understood by following the description and accompanying drawing, which shows a practical non-limiting embodiment of the invention. More specifically, in the drawing, where equal parts are indicated with the same reference numbers.

DETAILED DESCRIPTION OF AN EMBODIMENT OF THE INVENTION

The accompanying drawing shows an application of the invention to a double slitter-scorer machine, but it must be understood that the principles on which the invention is based can also be applied to machines of a different type, such as machines with a single cutting unit instead of two cutting units which operate alternately, or to machines with no scoring station, or even in more complex machines with a greater number of scoring and slitting stations.

Figure 1:
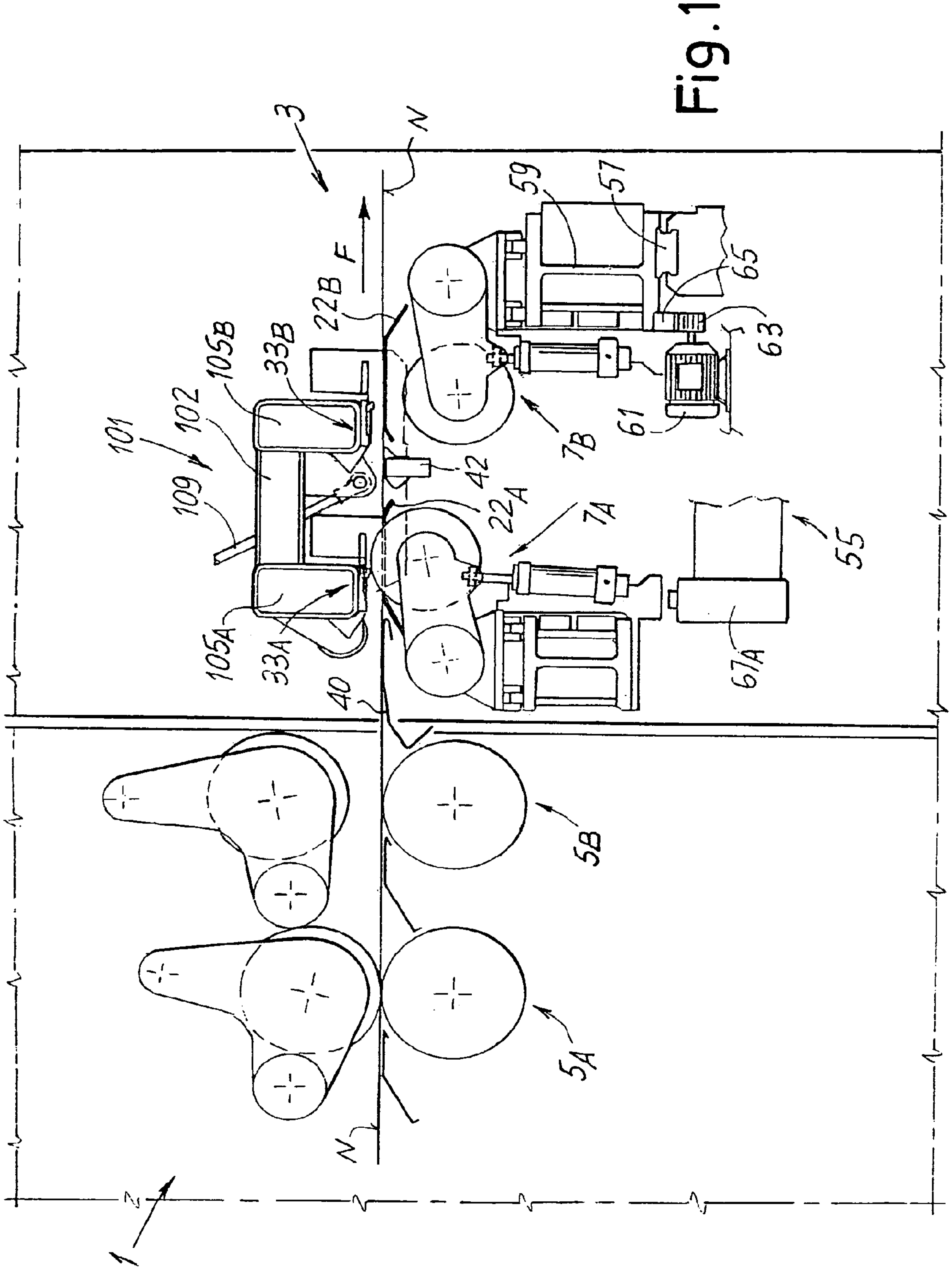
FIG. 1 shows a schematic side view of a slitter-scorer incorporating the invention.

FIG. 1 schematically shows a lateral view of the slitter-scorer machine, in which the number 1 schematically indicates the scoring section and the number 3 the slitting section. The scoring section comprises a first series of scoring tools 5A and a second series of scoring tools 5B. In the layout shown in FIG. 1 the scoring tools 5A are in the operating condition and act on the web material N, typically a corrugated cardboard web. The scoring tools 5B are in the inoperative position, that is, they do not act on the web material N.

Each scoring tool unit has upper tools and lower tools in an adequate number suitably distributed along the width of the machine to produce scoring lines in the desired positions along the web material. The configuration of the scoring tools is not the object of the present invention and is known per se. Therefore, the section 1 shall not be described in greater detail herein.

Figure 4:
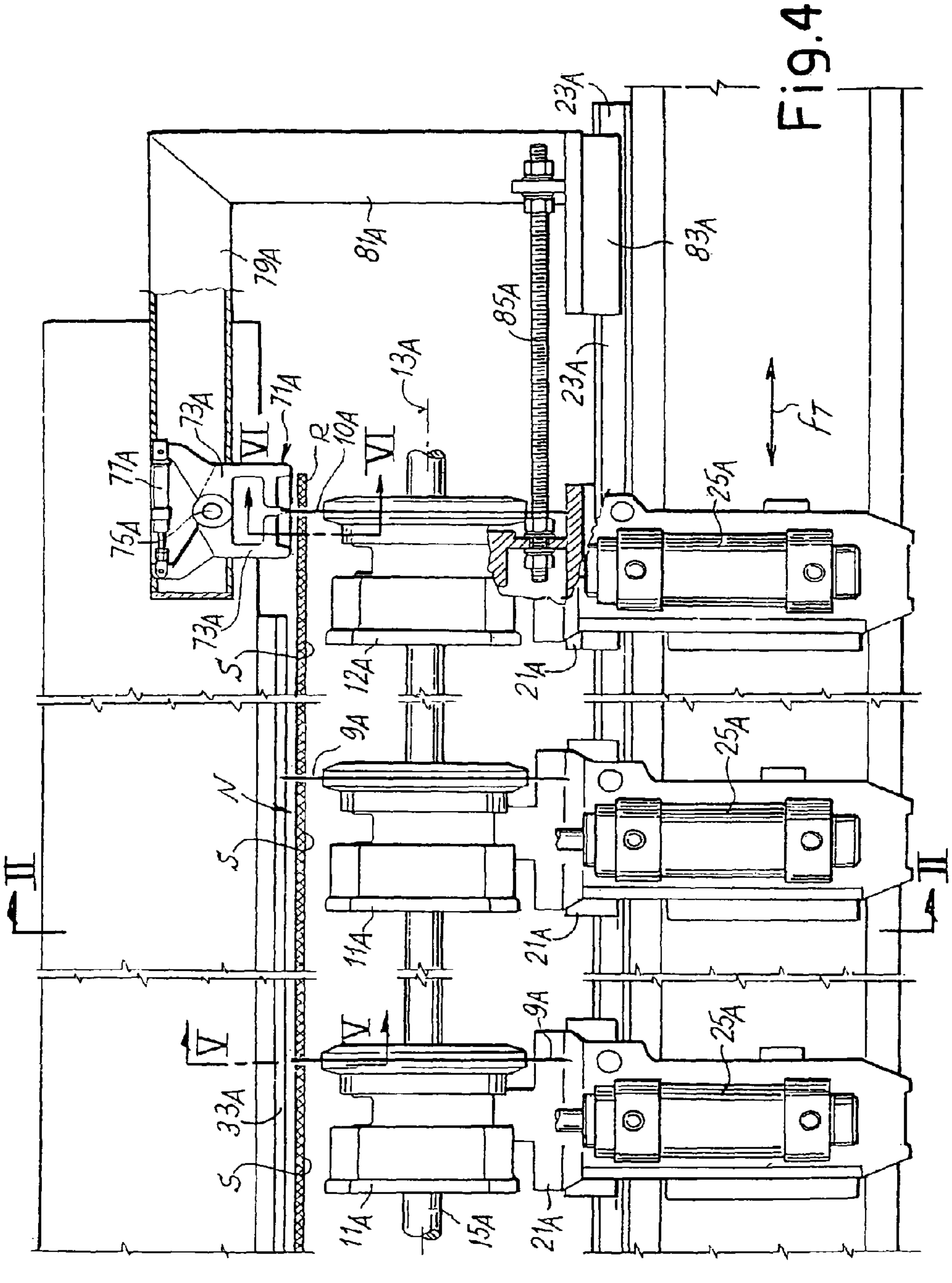
FIG. 4 shows a view according to IV-IV in FIG. 2.

The cutting section comprises two cutting units indicated as a whole with 7A and 7B. The first cutting unit is shown in greater detail in the enlargement in FIG. 2 and in the front view in FIG. 4. It comprises a plurality of disk-shaped blades 9A, each of which is carried by an arm 11A supported oscillating about an axis 13A common to all the arms 11A of the tools 9A. A common shaft 15A, the axis of which coincides with the axis 13A, transmits movement to the various disk-shaped cutting blades 9A using pulleys 17A and toothed belts 19A. The mechanical implementation of the individual arms 11A with the respective blade 9A and of the transmission of movement from the common shaft 15A to the individual disk-shaped blades 9A can be equivalent as the one described in the U.S. Pat. Nos. 6,092,452 or 6,165,117, which can be referred to for greater constructional details of these mechanical parts.

The individual oscillating arms 11A are carried by slides 21A sliding on guides 23A transverse to the direction of feed of the web material N, indicated with the arrow F in FIG. 1. Associated with each oscillating arm 11A is a piston-cylinder actuator 25A hinged in 27A to an appendix 29A of the slide 21A and in 31A to the corresponding oscillating arm 11A. The individual slides 21A can be locked in the various positions they must maintain during processing by means of pneumatic locking members indicated generically with 24A and housed under the sliding guides 23A. The locking means 24A are known per se and not described herein.

The individual actuators 25A control the oscillating movement of the arms 11A about the common geometric axis 13A to cause movement to the operating position or to the inoperative position of the individual tools or disk-shaped cutting blades 9A. The control methods of these movements can be analogous to those already described in the U.S. Pat. Nos. 6,092,452 or 6,165,117 and shall be set as a function of the type of processing and above all of the configuration of the processing line as a whole, in particular as a function of whether the system is provided with a double level to convey the individual strips S into which the disk-shaped blades 9A divide the web material N. The way in which the disk-shaped blades 9A are moved and the sequence of the oscillating movements to carry them to the operating and inoperative positions do not form a specific object of the present invention and can be the same as those already known from the aforesaid prior art.

The cutting unit 7A can comprise a variable number of intermediate disk-shaped blades 9A, depending also on the useful width of the machine. All these blades cooperate with a single counter-blade indicated as a whole with 33A and disposed on the opposite side of the path of the web material N with respect to the position of the axis 13A. In the example shown the disk-shaped blades 9A with the respective oscillating arms 11A, the slides 21A and the motor shaft 15A are disposed under the essentially horizontal path of the web material N, while the counter-blade 33A is disposed over said path.

This configuration is advantageous from various viewpoints. In the first place, it prevents drops of lubricating oil or grease from dripping accidentally from the lubricated mechanical members onto the web material N. Moreover, it allows an optimum quality of cut to be obtained, as the lower surface of the web material, through which the individual disk-shaped blades 9A penetrate said material, is the surface which will be outermost in the finished product and the edge cut by the blades 9A will have a more regular appearance on the face on which the cutting tools penetrated the web material. Moreover, this configuration offers advantages related to access to the machine for maintenance. Inverted configurations would also be possible, with the disk-shaped blades 9A positioned over the path of the cardboard and the counter-blade 33A positioned under said path.

Figure 5:
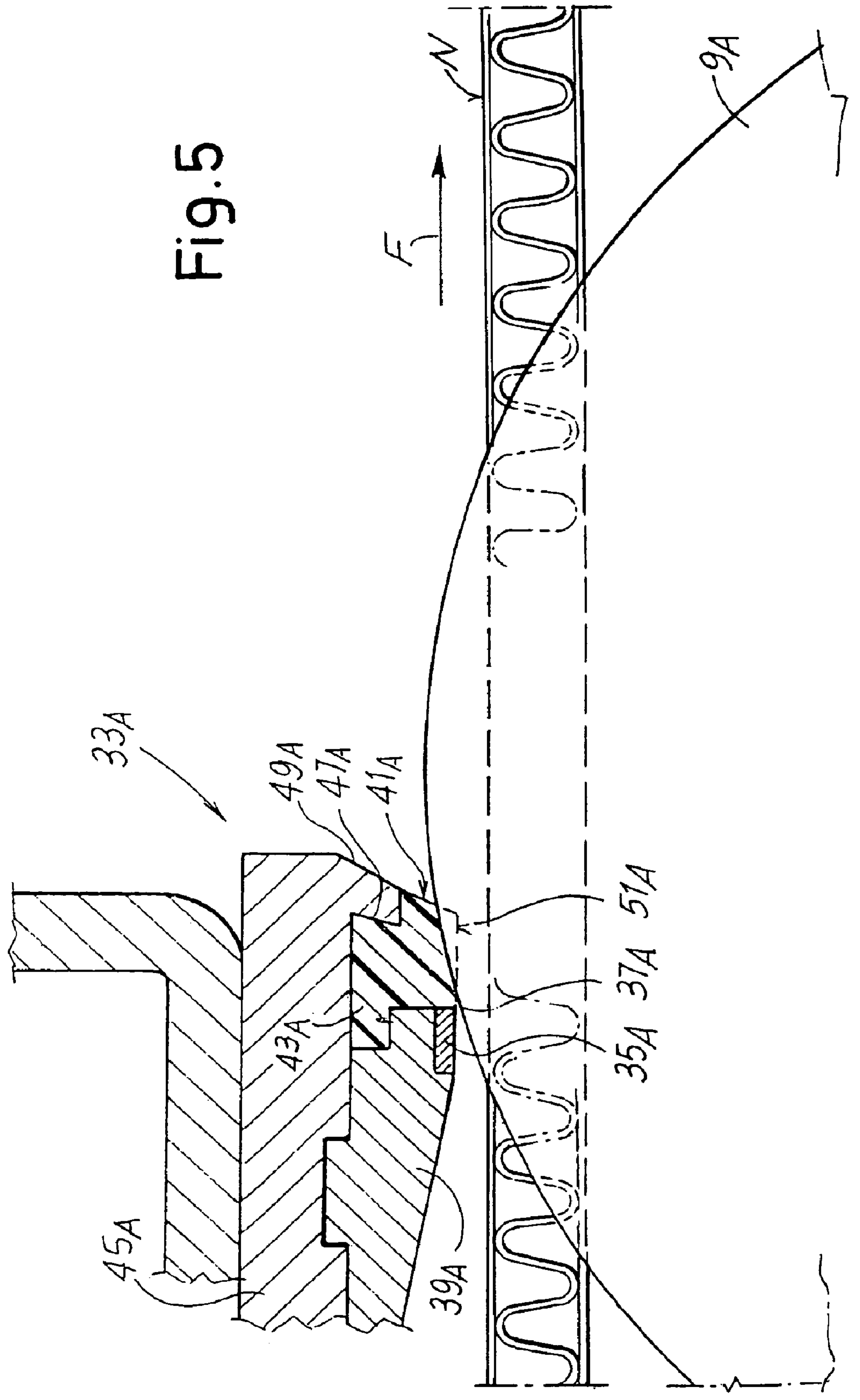
FIGS. 5 and 6 show two enlargements according to V-V and VI-VI in FIG. 4.
Figure 6:
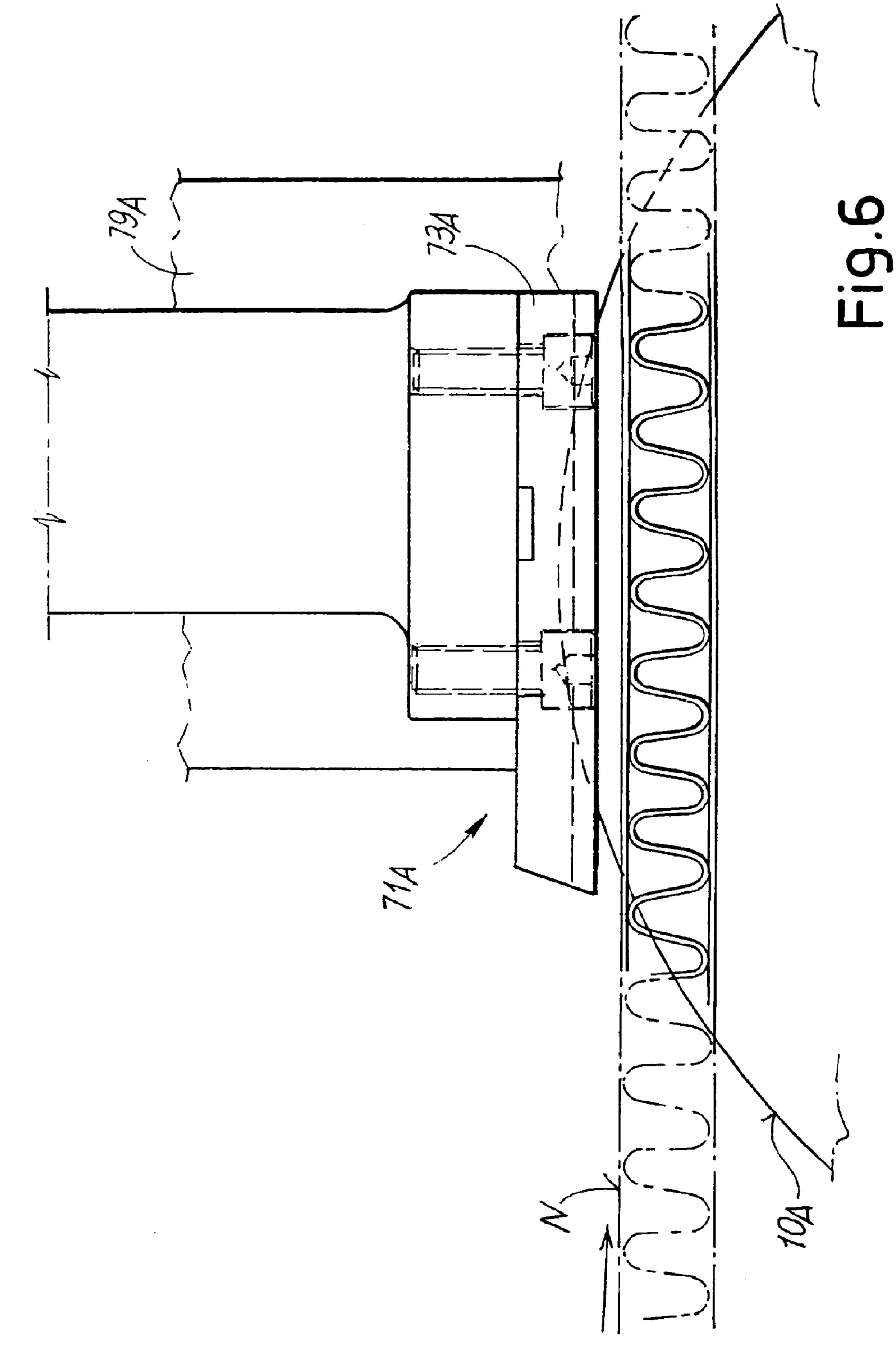
Figure 7:
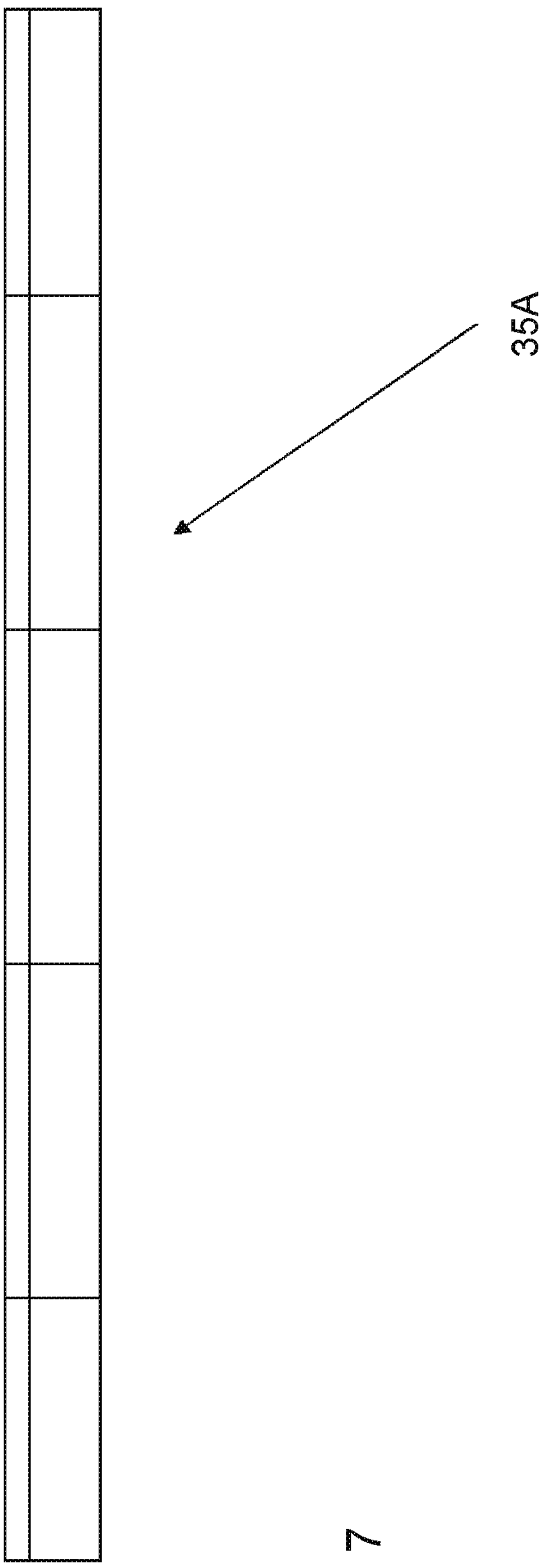
FIG. 7 shows a front view of the interchangeable block.

The configuration of the counter-blade 33A is shown in particular in the enlargement in FIG. 5. As can be seen in this figure, the counter-blade 33A comprises a rectilinear bar 35A with a flattened rectangular cross section, which extends transversely to the direction of feed F of the web material N. The bar 35A extends longitudinally for at least the maximum width to which the cutting blades 9A can be positioned to make the longitudinal cut in the web material N. Reference 37A indicates the lower edge, further forward in the direction F of feed of the web material N, of the bar 35A. The bar 35A is carried on a section bar 39A and can be produced in alloy steel, with high hardness. The section bar 39A with which the bar 35A is integral can be produced in a less prestigious and softer material.

Applied along the extension of the bar 35A is a block 41A, made of a plastic material and with a tooth 43A which is inserted between a projection of the section bar 39A and a base plate 45A, to which the section bar 39A is stably connected, for example with fixing screws, not shown.

At the front, the base plate 45A has an inclined edge 49A, with an inner surface parallel to an inclined face 47A of the block 41A. Therefore, the shape of the base plate 45A and the section bar 39A form a retaining channel for the plastic block 41A, which can be inserted in this retaining channel with a sliding movement orthogonal to the direction F of feed of the web material and therefore parallel to the longitudinal extension of the counter-blade. The channel defined by the section bar 39A and by the plate 45A and the block 41A are dimensioned so as to facilitate sliding into each other to facilitate insertion and replacement. Once inserted in position, the lower face 51A of the plastic block 41A is flush with the free lower surface of the bar 35A, to form a supporting surface on which the web material N runs during cutting. In FIG. 5 the web material N is shown not in contact with this surface for greater clarity of the graphical representation, but it must be understood that under the thrust of the disk-shaped blade 9A the web material N is made to lie against the lower surface of the bar 35A and of the plastic block 41A. If it does not lie on this surface, the web material can lie on an underlying series of rests 22A connected to the individual supports 21A of the oscillating arms carrying the blades 9A.

The block 41A can be produced (as indicated schematically in FIG. 4), in several portions or sections, individually replaceable, when made necessary by wear caused by the disk-shaped blades 9A and above all by the web material rubbing against the supporting surface formed by said block. To replace the sections, they are simply slid out of the retaining channel. To prevent accidental sliding, end stops can be provided, such as elastic pins which interfere with the block 41A to prevent it from escaping.

In the layout illustrated in the drawing, the disk-shaped blades 9A are operating and, as shown in particular in FIG. 5 for one of these blades, the circular cutting edge of the individual blades 9A operating penetrates the plastic material forming the block 41A to graze the edge 37A of the bar 35A, without touching it. The combination of the bar 35A with the block 41A ensures that the web material N is correctly cut by the blades 9A even if these do not graze the edge 37A of the bar 35A, but for example remain at a distance of about 1 mm from said edge. The supporting surface defined by the interchangeable block 41A is in fact sufficient to guarantee an effective cutting action on the web material. On the other hand, the effect of supporting and guiding the web material during the cut is not entrusted to the material forming the interchangeable block 41A, or at least not exclusively thereto. Therefore, even in the event of the interchangeable block 41A being worn and having a plurality of incisions caused by use with the disk-shaped blades 9A variously positioned along the transverse extension of the web material N while processing subsequent orders, the metal bar 35A, which is not worn by the blades, in any case provides adequate backing for the web material. In fact, it is the bar 35A which forms the active part of the counter-blade, contrary to the case described, for example, in U.S. Pat. No. 3,763,748, where the counter-blade is formed by the channel produced by the blade in the plastic material.

It is clear from the above that the counter-blade 33A does not require any positioning when the transverse positions of the disk-shaped cutting blades 9A are modified (between processing one order and processing a subsequent order). As the counter-blade 33A is rectilinear and continuous, it can always remain in the same position. This makes it unnecessary to provide a robot to position the counter-blades over the path of the web material, while the disk-shaped blades 9A can be positioned by a single robot, indicated as a whole with 55 in FIG. 1, disposed under the path of the web material.

The robot 55 slides along a guide 57 carried by a cross beam 59, which also carries the guides 23B on which the supports 21 B of the disk-shaped cutting blades 9B of the unit 7B slide, and is moved transversely to the direction of feed F of the web material N using a motor 61 and a rack 65 and pinion 63 mechanism. The robot 55 has two manipulators 67A and 67B to position the cutting blades of the unit 7A and 7B respectively.

The positions in which the disk-shaped cutting blades 9A are placed during processing of individual orders are normally spaced from one another by a distance sufficient to prevent excessive wear of the plastic block 41A. In this way, it is possible to process a high number of orders in succession before having to replace the block. However, the cutting lines producing the lateral trimmings of the web material N are, on the other hand, very close to each other in the individual work orders. Therefore, wear could be concentrated at the sides of the block 41A, making it necessary to stop the machine frequently to replace at least the lateral portions of the block. To prevent this, according to the invention the two lateral disk-shaped blades, indicated with 10A for the cutting unit 7A, do not cooperate with the fixed rectilinear counter-blade 33A, but with two specific counter-blades, indicated with 71A, destined to work only with the blades that cut the trimmings.

Figure 2:
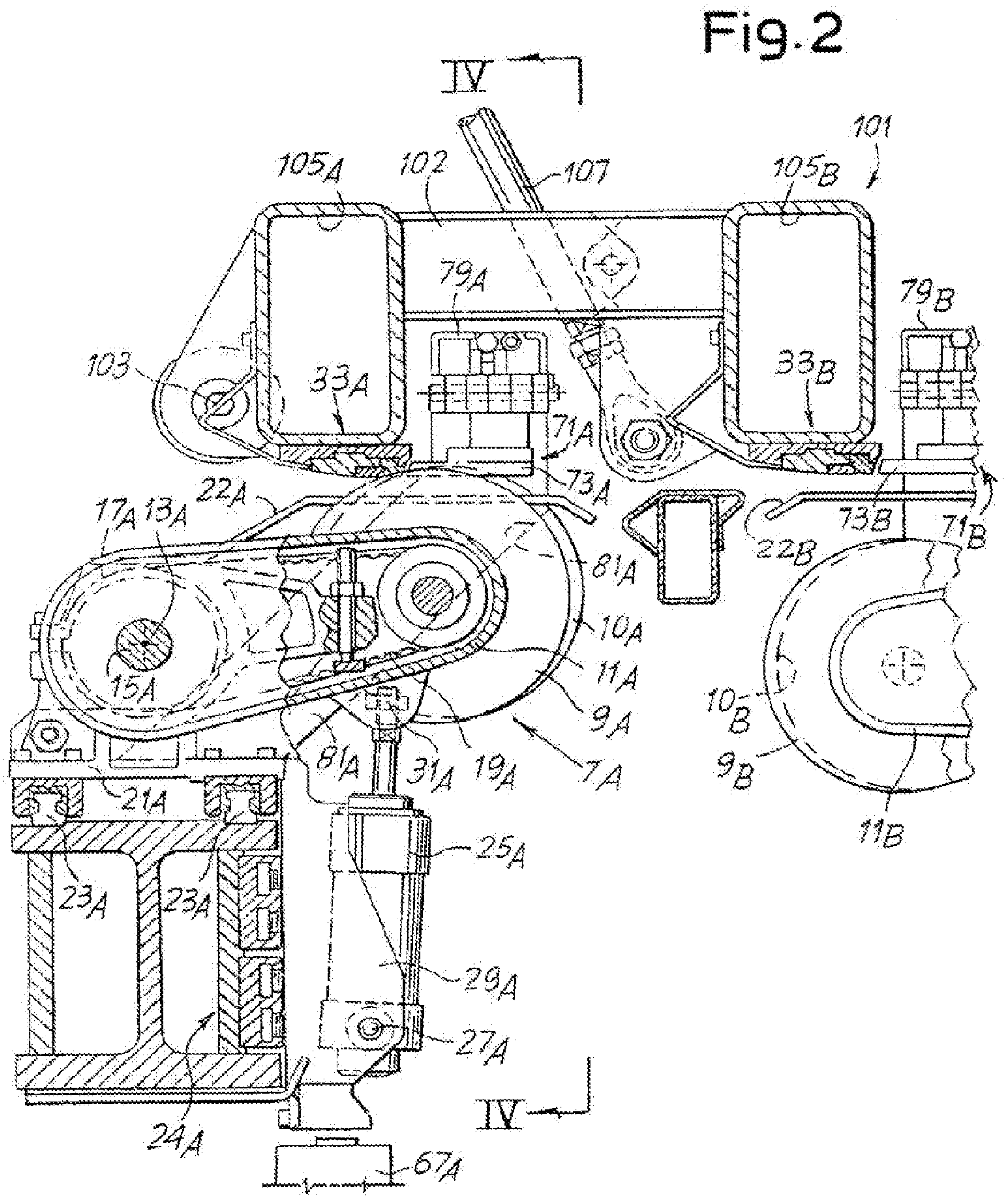
FIG. 2 shows a section according to II-II in FIG. 4 of one of the two cutting blade units.
Figure 3:
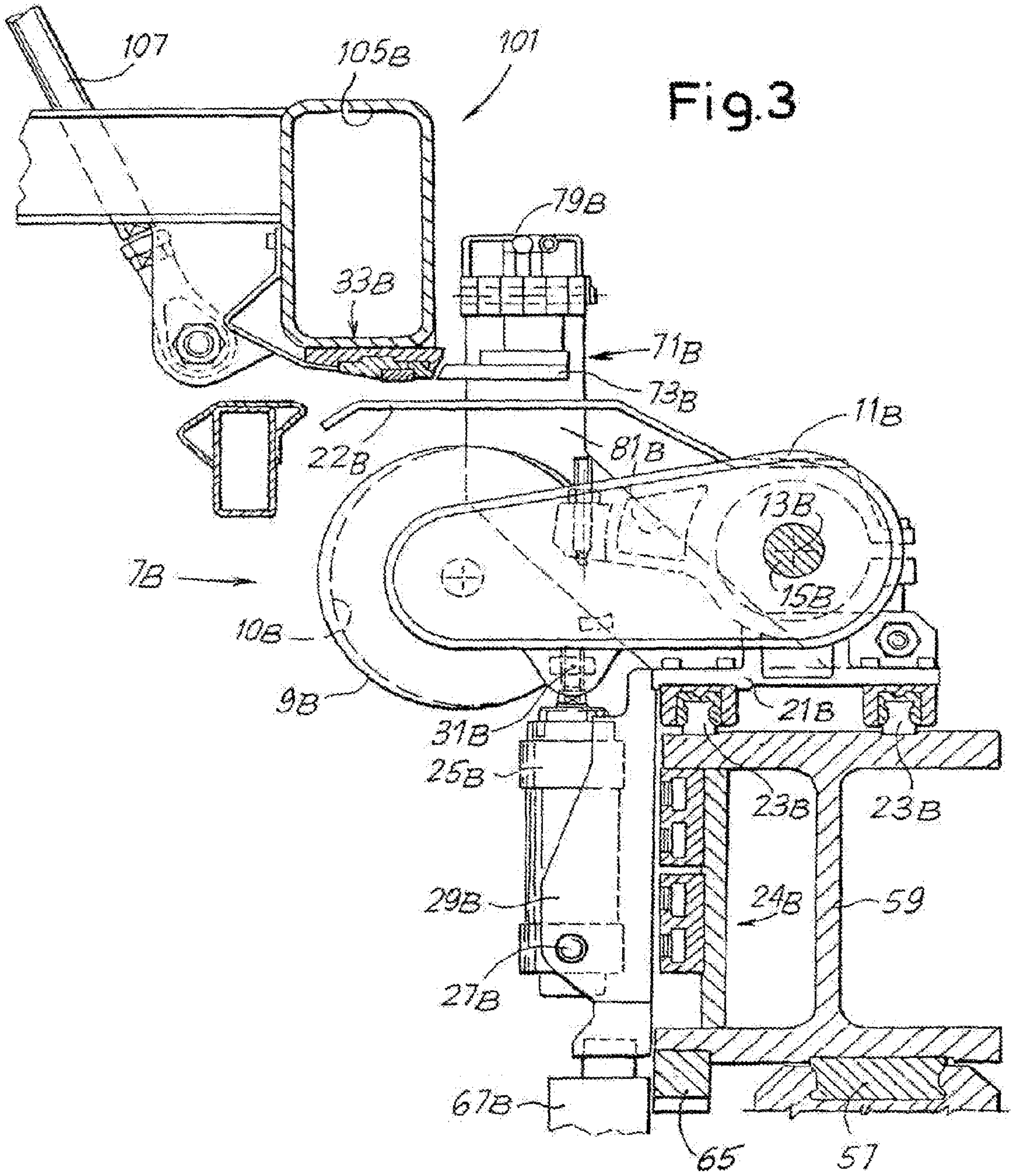
FIG. 3 shows a section analogous to FIG. 2 of the second cutting blade unit.

As can be observed in particular in FIG. 2, the disk-shaped blades 10A cooperating with the counter-blades 71A to produce the trimmings (one of which is indicated with R in FIG. 4) are in a position slightly further forward than the blades 9A. The oscillating arms, indicated with 12A, which carry the lateral disk-shaped blades 10A, are slightly longer with respect to the oscillating arms 11A carrying the blades 9A, although they are essentially the same as the latter with regard to the mechanical configuration and are carried by supports 21A essentially the same as the supports 21A carrying the oscillating arms 11A. The number 25A again indicates the piston-cylinder actuator which, analogous to the one provided for the arms 11A and the blades 9A, causes oscillation which carries the lateral blades 10A respectively to the operating position and to the inoperative position.

The counter-blades 71A (see FIG. 4) comprise lateral supports or jaws 73A pivoting in 75A and connected to each other by an actuator 77A and by an elastic member parallel thereto, not shown. The arrangement is such that the elastic member tends to hold the two shoes 71A spread apart, while the actuator 77A, overcoming the force of the elastic member, closes the shoes, pushing them against the sides of the blade 10A which is between them. Therefore, when the blade must engage in or disengage from the counter-blade, the actuator is extended or in any case deactivated and the elastic member spreads the shoes apart, while once the blade is in the operating position, the actuator 77A closes the shoes against the sides of the blade.

Each of the two counter-blades 71A is carried by a cross-member 79A connected, by means of an upright 81A, to a shoe 83A sliding on the guide 23A. The shoe 83A is connected rigidly by a threaded bar 85A to the support 21A carrying the oscillating arm 12A on which the respective lateral disk-shaped blade 10A is mounted. This results in a transverse movement according to the arrow fT (FIG. 4) of the support 21A to position the blade 10A with respect to the transverse extension of the web material N simultaneously causing a transverse movement of the respective counter-blade 71A. The latter therefore always remains in the correct position with respect to its blade 10A, without requiring a manipulator device to position the counter-blade 71A when the order is changed. The threaded bar 85A allows adjustment during setting up of the machine to take the lateral counter-blade 71A to the correct position with respect to the lateral blade 10A, so that the lateral jaws 73A of the counter-blade 71A act, in a symmetrical and balanced manner, on the sides of the blade 10A.

The length of the cross-member 79A is sufficient to allow trimmings of a considerable width to be cut without the upright 81A interfering with the lateral edge of the web material N. Moreover, the length of the cross-member allows web materials with variable widths to be used for different orders, without, for example, a wider material to be used in the subsequent order interfering with the uprights 81A or 81B positioned to process the order in progress with a narrower web material.

The cutting unit 7B is essentially the same as the cutting unit 7A and will not be described in detail herein, except for the elements that differentiate the two units. Parts of the unit 7B the same as or equivalent to those of the unit 7A are indicated in the drawings with the same reference number followed by the letter B in place of the letter A. In the layout shown in the drawings, the cutting unit 7A is operating, while the cutting unit 7B is inoperative, with the blades 9B and 10B disengaged from of the web material. In these conditions, the manipulator 67B of the robot 55 can position the individual blades transversely by sliding the supports 21B of the oscillating arms 11B along the guides 23B.

The arrangement of the fixed counter-blade 33B and of the two lateral counter-blades 71B is essentially the same as the counter-blade 33A and the counter-blades 71A of the unit 7A, that is, with the lateral counter-blades 71B (movable transversely together with the lateral blades 10A) positioned downstream of the fixed counter-blade 33B with respect to the direction of feed F of the web material N. As a result, the arms 12B supporting the lateral disk-shaped blades 10B to cut the trimmings R of the web material N are for the cutting unit 7B shorter with respect to the arms 11B instead of longer as in the case of the arms 12A with respect to the arms 11A of the cutting unit 7A. The rest of the arrangement of the mechanical parts is essentially symmetrical to the group 7A.

Operation of the machine described above is as follows. In the layout shown in the drawings, the intermediate disk-shaped cutting blades 9A and the lateral cutting blades 10A are engaged in the web material N to divide it into the various strips S and to produce two lateral trimmings R. The disk-shaped blades 9B and the lateral disk-shaped blades 10B of the cutting unit 7B are, instead, in the inoperative position and therefore by means of the manipulator 67A the robot 55 can set these blades in the positions required for the order to be processed subsequently to the one currently in production.

It must be understood that, according to the order to be processed, a variable number of intermediate disk-shaped blades 9B can be positioned and subsequently made to operate, according to the number of strips S into which the web material N must be divided. For the reasons explained above, positioning of the disk-shaped blades 9B of the unit 7B does not require positioning of the counter-blade 33B, while positioning of the lateral blades 10B also causes automatic positioning of the lateral counter-blades 71A, thereby making it unnecessary to provide a manipulator over the path of the web material N. Once positioning has taken place and the order currently being produced has been terminated, the actuators 25A of the cutting unit 7A carry the blades 9A and 10A to the inoperative position in the appropriate sequence, while the actuators 25B of the cutting unit 7B perform the opposite operation, by carrying the intermediate blades 9B and the lateral blades 10B to the operating position, again in the appropriate sequence. The use of suitable encoder means, position sensors or the like, allows the controller unit of the machine to know, at all times, the position to which the robot 55 has carried the individual blades 9A, 10A, 9B and 10B.

It is also possible to provide for recovery of the position of the blades at any specific time in the event of accidental deletion of the memory containing this information, for example by making the robot 55 travel across the machine and reading, with a suitable sensor, such as a magnetic sensor, the position of the individual supports or slides 21A and 21B which for this purpose will be equipped with a magnetic insert or other equivalent means, for example for the use of position sensors of the capacitive, optical or other type.

In practice, positioning of the tools for processing the subsequent order may take place as follows. If the system has stored the position of the cutting blades, the manipulator simply translates the individual blades from their current position to process the previous order, to the position required to process the order subsequent to the current one. If the system does not have the position of the cutting blades in the memory, for example, due to a black-out, the manipulator, equipped with a magnetic, capacitive, optical or other type of sensor, determines the current position of the cutting blades with a traverse movement and, after memorizing these positions, moves them to the position for the subsequent order.

As can be seen in particular in FIG. 2, the fixed counter-blades 33A, 33B are carried by a cross-member 101 hinged in 103 to the fixed structure of the machine. The cross-member 101 is formed in practice of two beams 105A and 105B (tubular in the example shown) joined by joining elements 102. The beams 105A, 105B carry the two counter-blades 33A and 33B respectively. The cross-member 101 is connected to the rod 107 of a piston-cylinder actuator 109 (FIG. 1), which controls raising of the cross-member 101 with a rotational movement about the axis 103 when it is necessary to perform maintenance operations on the machine, for example to replace part or all of the interchangeable plastic block 41A or 41B of the counter-blade 33A or 33B.

The joining elements 102 which join the cross-members 105A, 105B can be produced in two hinged portions, as indicated with the dashed line and indicatively in FIG. 2. An actuator, not shown, can be used to raise the cross-member 105B slightly with respect to the supporting surface 22B when the blades 9B, 10B are inoperative and the blades 9A, 10A are operating. This reduces the risk of jamming of the strips of web material traveling under the counter-blade 33B, and the counter blades 71B when they are not used, due to the increased space created through raising the beam 105B.

To maintain the web material N lying on the sliding surface defined by the counter-blades 33A or 33B, or in any case to prevent it from warping between adjacent cutting blades, one or other or both of the supporting section bars, indicated with 40 and 42 in FIG. 1, may be provided with a raising movement, for example controlled by piston-cylinder actuators, to sustain the web material N and push it upwards.

It is understood that the drawing purely shows a practical embodiment of the invention, which may vary in forms and arrangements, without however departing from the scope of the concept on which the invention is based.

What I claim is:

1. A device for longitudinal cutting of a continuous web material, the device defining a path for the web material, a direction of feed, and including, along said path, at least one cutting unit comprising:

a plurality of blades disposed on one side of said path, each of the plurality of blades being adjustably positionable transversely to the direction of feed of the web material and cooperating with a fixed counter-blade disposed on the opposite side of said path, the fixed counter-blade including a rectilinear element extending transversely to the direction of feed of the web material, said rectilinear element including a metal bar carried on a section bar made of a softer material than said metal bar; and an interchangeable block made of plastic material associated therewith; wherein said metal bar forms an active part of the counter-blade; wherein said blades and said metal bar are arranged such that said blades skim a rectilinear edge of said metal bar without touching said metal bar; and wherein said path, said metal bar and said blades are arranged such that said blades penetrate into the continuous web material upstream of said interchangeable block, with respect to said direction of feed, wherein said section bar is integral with a base plate, wherein said base plate and said section bar form a retaining channel to house said interchangeable block, and wherein one of said base plate and said section bar has a wall defining a portion of said channel, said wall being between the web material and a portion of the interchangeable block to limit movement of the interchangeable block in a direction of the web material.

2. Device as claimed in claim 1, wherein said section bar has said wall.

3. Device as claimed in claim 1, wherein said interchangeable block is positionable in said channel in a transverse direction, said channel limiting movement of said interchangeable block in a direction toward the web material.

4. Device as claimed in claim 1, wherein said metal bar and said interchangeable block form a flat supporting and sliding surface for the web material.

5. Device as claimed in claim 1, wherein said interchangeable block is produced of a plurality of sections aligned along the extension of the counter-blade.

6. Device as claimed in claim 5, wherein said sections forming the interchangeable block are replaceable by sliding them out of the retaining channel.

7. Device as claimed in claim 1, wherein said blades are positioned under the path of the web material, said path being essentially horizontal.

8. Device as claimed in claim 1, wherein said blades are disposed under the path of the web material and said counter-blade is arranged over said path.

9. A device for longitudinal cutting of a continuous web material, the device defining a path for the web material, a direction of feed, and including, along said path, at least one cutting unit comprising:

a plurality of blades disposed on one side of said path, each of the plurality of blades being adjustably oositionable transversely to the direction of feed of the web material and cooperating with a fixed counter-blade disposed on the opposite side of said path, the fixed counter-blade including a rectilinear element extending transversely to the direction of feed of the web material, said rectilinear element including a metal bar carried on a section bar made of a softer material than said metal bar; and an interchangeable block made of plastic material associated therewith; wherein said metal bar forms an active part of the counter-blade; wherein said blades and said metal bar are arranged such that said blades skim a rectilinear edge of said metal bar without touching said metal bar; and wherein said path, said metal bar and said blades are arranged such that said blades penetrate into the continuous web material upstream of said interchangeable block, with respect to said direction of feed, wherein said section bar is integral with a base plate, wherein said base plate and said section bar form a retaining channel to house said interchangeable block, and wherein the channel is defined by walls having an opening facing toward the web material, said opening having a dimension in said direction of feed, a portion of the interchangeable block positioned in the channel having a dimension larger than said dimension of said opening to limit movement of the interchangeable block in a direction of the web material.

10. Device as claimed in claim 9, wherein at least one wall of said channel is tapered to narrow said opening.

11. Device as claimed in claim 9, wherein at least one wall of said channel projects across said channel to narrow said opening.

12. Device as claimed in claim 9, wherein said interchangeable block is positionable in said channel in a transverse direction.

13. Device as claimed in claim 9, wherein said metal bar and said interchangeable block form a flat supporting and sliding surface for the web material.

14. Device as claimed in claim 9, wherein said interchangeable block is produced of a plurality of sections aligned along the extension of the counter-blade, said sections forming the interchangeable block being replaceable by sliding them out of the retaining channel.

15. Device as claimed in claim 9, wherein said blades are disposed under the path of the web material and said counter-blade is arranged over said path.

16. A device for longitudinal cutting of a continuous web material, the device defining a path for the web material, a direction of feed, and including, along said path, at least one cutting unit comprising:

a plurality of blades disposed on one side of said path, each of the plurality of blades being adjustably positionable transversely to the direction of feed of the web material and cooperating with a fixed counter-blade disposed on the opposite side of said path, the fixed counter-blade including a rectilinear element extending transversely to the direction of feed of the web material, said rectilinear element including a metal bar carried on a section bar made of a softer material than said metal bar; and an interchangeable block made of plastic material associated therewith; wherein said metal bar forms an active part of the counter-blade; wherein said blades and said metal bar are arranged such that said blades skim a rectilinear edge of said metal bar without touching said metal bar; and wherein said path, said metal bar and said blades are arranged such that said blades penetrate into the continuous web material upstream of said interchangeable block, with respect to said direction of feed, wherein said section bar is integral with a base plate, wherein said base plate and said section bar form a retaining channel to house said interchangeable block, and wherein the interchangeable block has a generally Z-shaped cross-section, said channel capturing a portion of the interchangeable block on four sides to limit movement of the interchangeable block in a direction of the web material.

17. Device as claimed in claim 16, wherein said interchangeable block is positionable in said channel in a transverse direction.

18. Device as claimed in claim 16, wherein said metal bar and said interchangeable block form a flat supporting and sliding surface for the web material.

19. Device as claimed in claim 16, wherein said interchangeable block is produced of a plurality of sections aligned along the extension of the counter-blade, said sections forming the interchangeable block being replaceable by sliding them out of a retaining channel.

20. Device as claimed in claim 16, wherein said blades are disposed under the path of the web material and said counter-blade is arranged over said path.

* * * * *

UNITED STATES PATENT AND TRADEMARK OFFICE

CERTIFICATE OF CORRECTION

PATENT NO. : 8,342,068 B2
APPLICATION NO. : 12/396161
DATED : January 1, 2013
INVENTOR(S) : Mauro Adami It is certified that error appears in the above-identified patent and that said Letters Patent is hereby corrected as shown below:

On the title page, at the Assignee: Replace the name “Foser” with the name --Fosber--

Signed and Sealed this
Sixteenth Day of July, 2013

Teresa Stanek Rea
*Acting Director of the United States Patent and Trademark Office*